(12) United States Patent
Bauer et al.

(10) Patent No.: US 11,073,194 B2
(45) Date of Patent: Jul. 27, 2021

(54) PLANETARY GEARSET

(71) Applicant: ZF FRIEDRICHSHAFEN AG, Friedrichshafen (DE)

(72) Inventors: Christoph Bauer, Windorf (DE); Stefan Grabitzky, Meckenbeuren (DE); Manfred Klose, Tettnang (DE); Walter Fischer, Friedrichshafen (DE); Andreas Bauer, Windorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/828,476

(22) Filed: Mar. 24, 2020

(65) Prior Publication Data

US 2020/0309234 A1 Oct. 1, 2020

(30) Foreign Application Priority Data

Mar. 25, 2019 (DE) ...................... 10 2019 204 015.2

(51) Int. Cl.
*F16H 48/06* (2006.01)
*F16H 1/30* (2006.01)
*F16H 57/04* (2010.01)

(52) U.S. Cl.
CPC .............. *F16H 1/30* (2013.01); *F16H 48/06* (2013.01); *F16H 57/0479* (2013.01)

(58) Field of Classification Search
CPC ........ F16H 1/30; F16H 57/0479; F16H 48/06; F16H 57/021; F16H 57/08; F16H 2057/02052; F16H 1/28; B60Y 2200/221; B60B 35/16; B60B 35/125
See application file for complete search history.

(56) References Cited

U.S. PATENT DOCUMENTS

| 3,365,986 A | * | 1/1968 | Mazziotti | F16H 1/2809 |
| | | | | 475/346 |
| 4,183,266 A | * | 1/1980 | Osumi | F16H 1/46 |
| | | | | 475/331 |
| 4,283,963 A | * | 8/1981 | Hickey | F16C 19/54 |
| | | | | 475/246 |

(Continued)

FOREIGN PATENT DOCUMENTS

DE 196 04 824 A1 8/1997

OTHER PUBLICATIONS

"The Transmission Book", 2nd revised edition, p. 365, Fig. 8.23.

*Primary Examiner* — James Holmes
(74) *Attorney, Agent, or Firm* — Finch & Maloney, PLLC; Michael J. Bujold; Jay Franklin

(57) ABSTRACT

A planetary gearset (6) has a sun gear (10) connected rotationally fixedly to an input shaft (8), a carrier (15) that carries planetary gears (11) and is connected rotationally fixedly to an output shaft (16), and a ring gear (14) fixedly connected to a housing (4) that encloses the planetary gearset (6). To reduce the noise emission from the planetary gearset with as little structural complexity as possible without reducing its efficiency due to pressure rings that are guided and slide against the planetary gears and the carrier, the sun gear (10), the planetary gears (11) and the ring gear (14) are provided with helical teeth and the input shaft (8) is at least indirectly supported on the housing (4), in both axial directions, by way of a single roller bearing (20).

9 Claims, 1 Drawing Sheet

(56) References Cited

U.S. PATENT DOCUMENTS

| | | | | |
|---|---|---|---|---|
| 4,649,772 A | * | 3/1987 | Daniel | B60K 17/046 |
| | | | | 180/10 |
| 2015/0105207 A1 | * | 4/2015 | Hagedorn | F16H 57/0018 |
| | | | | 475/149 |
| 2017/0146096 A1 | * | 5/2017 | Watanabe | F16C 19/543 |
| 2019/0293158 A1 | * | 9/2019 | Brown | B60K 17/046 |

* cited by examiner

PLANETARY GEARSET

This application claims priority from German patent application serial no. 10 2019 204 015.2 filed Mar. 25, 2019.

FIELD OF THE INVENTION

The invention relates to a planetary gearset having a sun gear connected rotationally fixed to an input shaft, a carrier that supports planetary gears and is connected rotationally fixed to an output shaft, and a ring gear fixed in a housing that radially encloses the planetary gearset.

BACKGROUND OF THE INVENTION

Such planetary gearsets are provided for many applications in automotive technology and other technical fields. A wheel hub transmission of the type mentioned in the preamble of the independent claim(s) is known from the textbook "The Transmission Book", 2nd revised edition, page 365, FIG. 8.23. In that case a powershift transmission of an agricultural tractor drives the rear wheels of the tractor via a differential gear system arranged on a rear axle and planetary stages in each case arranged downstream thereof, which act as transmission gearing.

In that case an input shaft connects the differential gear system to a sun gear of the planetary stage and an output shaft is driven, via a carrier, when the ring gear is stationary. As a rule such planetary stages comprise gearwheels and a toothed rim of the ring gear with straight teeth, so that when the teeth engage no axial forces are produced that would act upon the input shaft. The disadvantage of planetary stages with straight teeth is that they do not run very smoothly, so a lot of noise is emitted.

Furthermore, from DE 196 04 824 A1 a planetary gearset is known, whose drive input shaft is provided with helical teeth on the sun gear. Consequently, planetary gears engaged with the teeth of the sun gear and the internal teeth of a ring gear are also helical. The helical teeth are used in order to run substantially more smoothly compared with straight teeth, and therefore to emit less noise. However, the problem here is that due to the helical teeth large axial forces are produced, which impose very high loads on adjacent components such as the drive input shaft and the drive output shaft. Helix angles of the helical teeth should be in the range between 10° and 15°, as is usually the case.

To control the axial forces that occur on both end faces of the planetary gears, on the one hand, pressure rings that act against the teeth of the sun gear and pressure rings between the ring gear and the planetary gears are provided, and, on the other hand, a cover is arranged between a planetary carrier and the drive input shaft and is intended to absorb the axial forces of the helical teeth of the planetary gearset and lock them into the drive input shaft.

SUMMARY OF THE INVENTION

The object of the present invention is to reduce the noise emitted by the planetary gearset with as little structural complexity as possible, without reducing its efficiency due to pressure rings that slide on the planet gears and the carrier.

This objective is achieved on the basis of the characterizing features of the independent claim(s). The subsequent, dependent claims in each case describe advantageous further developments of the invention.

According to these, a planetary gearset comprises a sun gear connected rotationally fixed to an input shaft, a carrier that supports planetary gears and is connected rotationally fixed to an output shaft, and a ring gear fixed in a housing. Such a planetary gearset is operated with a fixed gear ratio.

According to the invention the sun gear, the planetary gears and the ring gear are provided with helical teeth, whereby the extent of tooth overlap is increased. The degree of overlap corresponds to the ratio of the contact length to the pitch of the gearwheel. Compared with straight teeth, helical teeth always have a larger extent of overlap because several tooth pairs are engaged. The power transmission does not start directly over the entire tooth width, as in the case of straight teeth, but increases gradually, because at the beginning of the engagement the full width of the teeth is not yet engaged. Furthermore, at the end of engagement the power transmission does not cease abruptly since the tooth slides gradually out of its engagement. This results in smoother running and significantly less noise.

In connection with the helical teeth provided for the planetary gearset, it must also be provided according to the invention that the input shaft is supported at least indirectly against the housing in both axial directions by means of a single roller bearing. Due to the axial forces that occur because of the helical teeth, although the input shaft should be supported in both axial directions by a roller bearing, a degree of freedom of the input shaft at least in the area of the sun gear should be maintained in the radial direction.

In contrast, the publication "The Transmission Book", 2nd revised edition, page 365, FIG. 8.23 does not mention that the gearwheels and gear rings of the planetary gearset arranged on the rear axle of a tractor should have helical teeth. It is true that DE 196 04 824 A1 shows a planetary gearset provided with helical teeth, but in that case pressure rings are to be arranged between the planetary gears, on the one hand, and the sun gear and the ring gear on the other hand. Besides, the drive input shaft and the carrier are supported against one another by way of a cover.

In further embodiments of the invention it is proposed that the planetary gearset is provided in the form of an axle transmission of a driven wheel axle of a vehicle that can be used for agricultural or building construction purposes, the input shaft being connected to an axle differential at its end facing away from the planetary gear. The transmission is in this case preferably a rear axle transmission of an agricultural or building construction machine. The input shaft is supported by a roller bearing in both axial directions against a flange connected to the housing, so that the axial forces that occur are absorbed by the latter and transmitted to the housing. In addition, the input shaft, which is articulated in the axle differential, is mounted in a radially floating manner in the housing, so that its radial degree of freedom is maintained in the area of the sun gear.

It is further provided that the helical teeth have a helix angle $\beta \leq 10°$. With a small helix angle, relatively small axial forces are produced, which can be supported by means of an inexpensive thrust bearing. In that case there is also the possibility to form the helical teeth with a helix angle $\beta \leq 5°$, preferably $\beta = 4°$. Such small helix angles already result in a considerable reduction of noise emissions of the planetary gearset, whereas the axial forces produced thereby on the input shaft are comparatively small so that they can be supported on the housing by a comparatively inexpensive roller bearing.

Preferably, the roller bearing is in the form of a deep-groove ball bearing which is fixed in the axial direction both with respect to the input shaft and also the housing but is guided so as to be radially movable with respect to the housing. In a deep-groove ball bearing the inner and outer ring are provided with deep grooves that form tracks and which are only slightly larger than the balls that serve as rolling bodies, so that little lubrication is needed. Since a corresponding deep-groove ball bearing can absorb axial forces and is available as a standard catalog item in many sizes, it is suitable as an inexpensive component for the axial support of the input shaft wherein the balls, when absorbing an axial force, rest on the tracks formed by the grooves at an operating pressure angle.

In a further embodiment of this arrangement using a deep groove ball bearing, the deep groove ball bearing is to be arranged in an annular groove of the housing or flange, a circumferential radial gap being provided between a radial circumference of an outer ring of the deep groove ball bearing and a bottom of the annular groove. This free space formed by the radial gap ensures that the necessary radial degree of freedom is maintained despite the bearing. The diameter of the annular groove is chosen such that the annular gap is formed between its cylindrical bottom and the outer circumferential surface of the outer ring. With its end faces, the deep-groove ball bearing rests on a shoulder and on circlips provided on the input shaft and in the flange.

Finally, as an alternative to the deep-groove ball bearing, the roller bearing can be designed as a double-acting axial needle bearing or axial ball bearing. A corresponding axial bearing, which comprises two running disks, two rolling body crowns and a shaft disk positioned between them, should also be guided over the running disks on the housing or flange and over the shaft disk on the input shaft in such manner that although the input shaft is axially supported, it can undergo radial movements.

The invention is not limited to the indicated combination of characteristics specified in the principal claim and the claims that depend on it. There are also options for combining individual features with one another insofar as they emerge from the claims, the description given below or directly from the drawings. References in the claims to the drawings by the use of indexes are not intended to restrict the protective scope of the claims.

BRIEF DESCRIPTION OF THE DRAWINGS

An advantageous embodiment of the invention, which will be explained below, is illustrated in the drawings, which show.

DETAILED DESCRIPTION OF THE PREFERRED EMBODIMENTS

Figure 1:
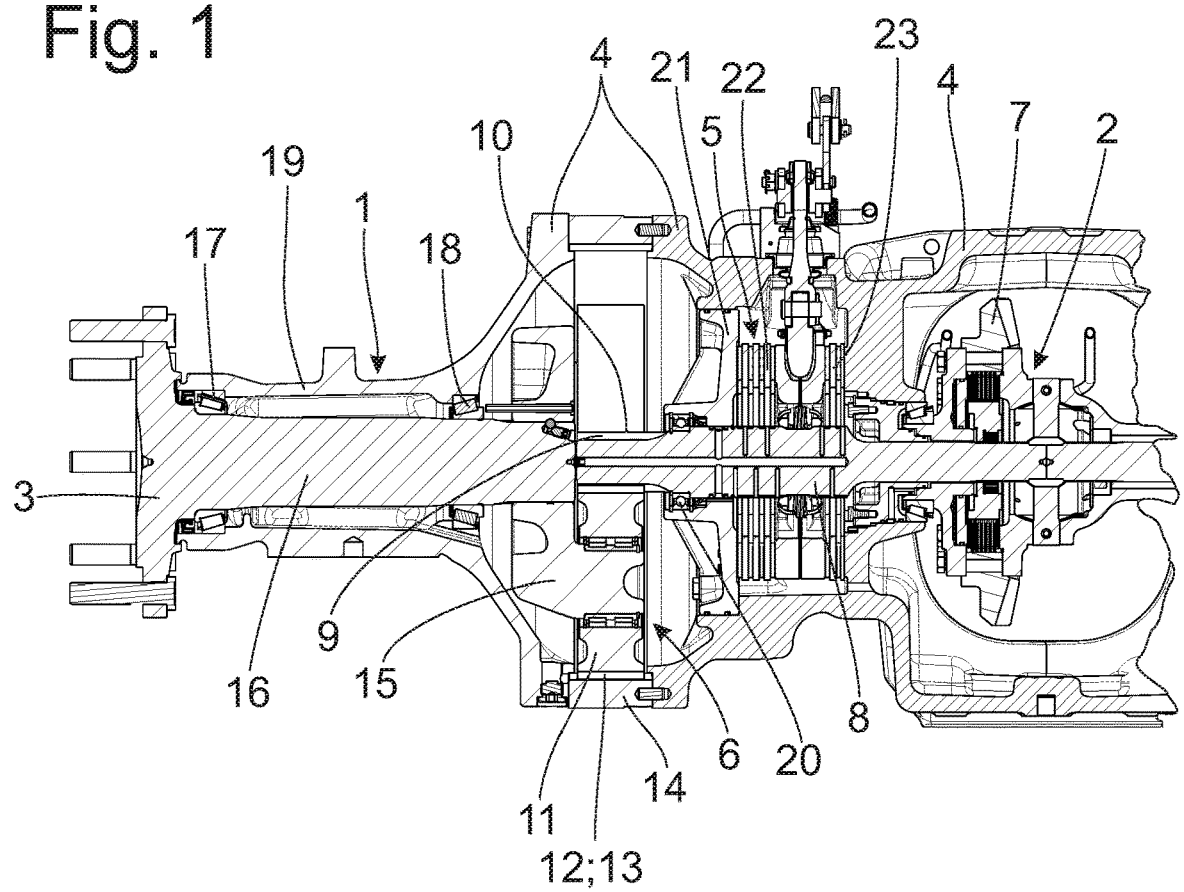
FIG. 1: A partial view of a longitudinal section through a driven wheel axle of a vehicle that can be used for agricultural or building construction purposes.

In FIG. 1 a drivable wheel axle indexed 1 is shown, of which only a left-hand portion extending essentially from an axle differential 2 as far as a wheel flange 3 can be seen. In this case the wheel flange 3 is provided for the support of a wheel rim (not shown) of a drive wheel. The other half of the wheel axle (not shown in this partial view) is essentially configured in mirror-image relationship and therefore also has the structure explained below. The wheel axle 1 is provided with a multi-component housing 4, which on its inside accommodates the aforesaid axle differential 2, a brake device 5 and a planetary gearset 6 that acts as a transmission gear unit. From the axle differential 2, which is driven by a crown gear 7, an input shaft 8 leads to the planetary gearset 6. This input shaft 8 is provided at its end guided into the planetary gearset 6 with helical teeth 9, which as part of the planetary gearset 6 therefore carry out the function of a sun gear 10.

In this case the helical teeth 9 of the sun gear 10 engage with external teeth 12 of a plurality of planetary gears 11, of which only one planetary gear 11 can be seen in the representation shown in FIG. 1. The external teeth 12 of this planetary gear 11 are consequently also in the form of helical teeth and in turn they engage with the internal teeth 13 of a ring gear 14 attached rotationally fixed to the housing 4. The planetary gear 11 and the other planetary gears are carried by and can rotate on a carrier 15, which is connected rotationally fixed to an output shaft 16. As can be seen from FIG. 1 the output shaft 16 and the wheel flange 3 are made integrally, and the output shaft 16 is mounted by means of tapered roller bearings 17 and 18 in a section of the housing 4 in the form of an axle tube 19.

As can be seen from the above explanations, the input shaft 8 is on the one hand connected to the axle differential 2 and on the other hand held on the sun gear 10 between the planetary gears 11. Thus, the input shaft 8 has no direct radial mounting in the housing 4 but rather, has a radial degree of freedom at its end guided in the planetary gears 11, i.e. on the sun gear 10 in order to be able to undergo radial movements during load changes.

The helical teeth 9 of the sun gear 10 and the planetary gears 11 and the ring gear 14 have only a relatively small helix angle of $\beta \leq 10°$, preferably $\beta \leq 5°$. In this case it is true that the helical teeth 9 of the sun gear 10 cause axial forces to be transmitted to the input shaft 8, which during load changes act in different axial directions. However, since compared with known embodiments the helix angle is very small, to support the comparatively small axial forces resulting therefrom, a single-furrowed deep-groove ball bearing 20 can, as shown, be provided by means of which the input shaft 8 is mounted in a flange 21. This flange 21 serves, besides, as a stator of the brake device 5 formed as a disk brake, whose actuation device engages between disk packs 22 and 23 and spreads them apart.

Figure 2:
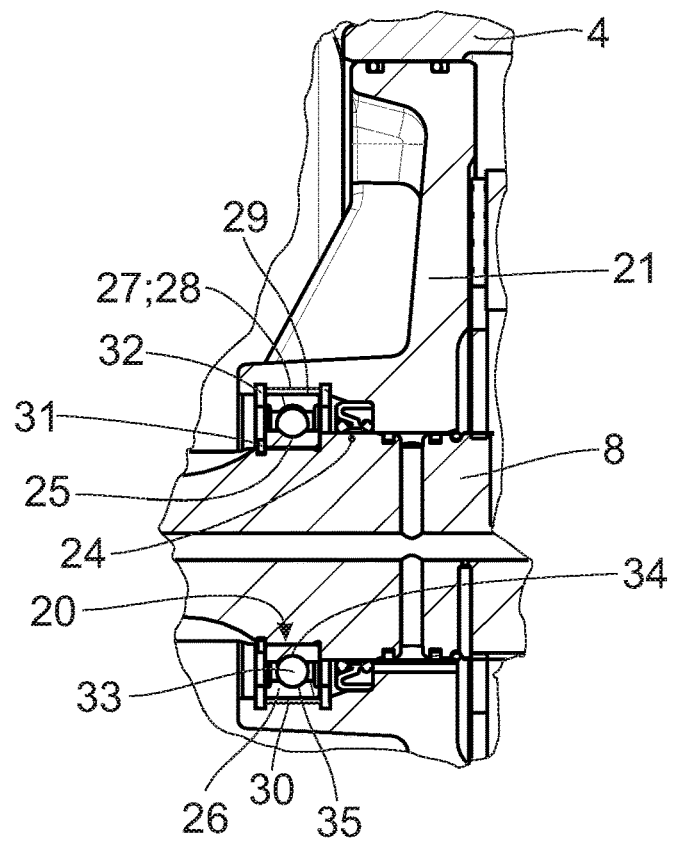
FIG. 2: An enlarged section II from FIG. 1, showing a flange fixed in a housing of the wheel axle for supporting a roller bearing.

As also shown in FIG. 2, the deep-groove ball bearing 20 consists of an inner ring 25 in contact on its end face with a cylindrical shoulder 24 of the input shaft 8 and an outer ring 26 which is arranged in a radially floating manner in a bore section 27 of the flange 21. Between an inner surrounding surface 28 of the bore section 27 and an outer surrounding surface 29 of the outer ring 26, an all-round radial gap 30 is provided. In the axial direction, on its end faces the outer ring 26 is guided on both sides by respective circlips 31 and 32 fixed in the flange 21.

By virtue of the helical teeth formed respectively on the sun gear 10, the planetary gears 11 and the ring gear 14 with a comparatively small helix angle $\beta$ in each case, the smooth running of the planetary gearset 6 is considerably improved, so that overall the noise emission of the axle drive is greatly reduced. The single-furrowed deep-groove ball bearing at the same time has arranged around the circumference of the inner ring 25 and the outer ring 26 spherical rolling bodies 33 which are guided in groove-shaped tracks 34 and 35. In this case the rolling bodies 33 are preferably arranged in a cage (not shown).

The deep-groove ball bearing 20 can absorb axial forces in both axial directions, since the rolling bodies 33 rest against the tracks 34 and 35 at an operating pressure angle extending acutely relative to a transverse plane of the deep-groove ball bearing 20 and transmit the axial forces.

The input shaft 8, which holds the deep-groove ball bearing 20, is supported by the latter in both axial directions on the flange 21 connected to the housing 4, so that the axial forces occurring can be absorbed by the flange 21 and transmitted to the housing 4. In the radial direction the input shaft 8 articulated in the axle differential 2 is radially mounted in the housing 4 in a floating manner, so that its necessary radial degree of freedom in the area of the sun gear is maintained. For that purpose the deep-groove ball bearing 20 is arranged in the flange 21 so as to form the all-round radial gap 30.

INDEXES

1 Drivable wheel axle
2 Axle differential
3 Wheel flange
4 Housing of 1
5 Brake device
6 Planetary gearset
7 Crown gear of 2
8 Input shaft
9 Helical teeth of 8
10 Sun gear of 6
11 Planetary gear of 6
12 External teeth of 11
13 Internal teeth of 14
14 Ring gear of 6
15 Carrier of 6
16 Output shaft
17 Tapered roller bearing
18 Tapered roller bearing
19 Axle tube of 1
20 Deep-groove ball bearing
21 Flange
22 Disk pack of 5
23 Disk pack of 5
24 Cylindrical shoulder of 8
25 Inner ring of 20
26 Outer ruing of 20
27 Bore section of 21
28 Inner surrounding surface of 27
29 Outer surrounding surface of 26
30 All-round radial gap
31 Circlip
32 Circlip
33 Tapered roller body
34 Groove-shaped track of 25
35 Groove-shaped track of 26

The invention claimed is:

1. A planetary gearset comprising:
a sun gear connected rotationally fixed to an input shaft,
a carrier, supporting planetary gears, which is connected rotationally fixed to an output shaft, and the output shaft being rotatably supported within a housing that encloses the planetary gearset,
a ring gear is rotationally fixed to the housing that encloses the planetary gearset,
the sun gear, the planetary gears and the ring gear each being provided with helical teeth, and
the input shaft being at least indirectly supported by the housing and fixed in both axial directions by a single roller bearing.

2. The planetary gearset according to claim 1, wherein the planetary gearset is provided as an axle transmission in a wheel axle of a vehicle that can be used for agricultural or building purposes, the input shaft is connected at its end, remote from the planetary gear, to an axle differential and is supported by the roller bearing, fixed in both of the axial directions, on a flange connected to the housing, and the input shaft is mounted in the housing in a radially floating manner such that the input shaft is radially movable relative to the housing.

3. The planetary gearset according to claim 1, wherein the helical teeth (9) have a helix angle $\beta \leq 10°$.

4. The planetary gearset according to claim 1, wherein the helical teeth (9) are formed with a helix angle $\beta \leq 5°$.

5. The planetary gearset according to claim 1, wherein the helical teeth (9) are formed with a helix angle $\beta = 4°$.

6. The planetary gearset according to claim 1, wherein the roller bearing is in a form of a deep-groove ball bearing, which is fixed, in the axial directions, both relative to the input shaft and relative to the housing and is radially movable relative to the housing.

7. The planetary gearset according to claim 1, wherein the roller bearing is in the form of a two-sided acting axial needle bearing or an axial ball bearing.

8. A planetary gearset comprising:
a sun gear connected rotationally fixed to an input shaft,
a carrier, supporting planetary gears, which is connected rotationally fixed to an output shaft,
a ring gear which is rotationally fixed to the housing that encloses the planetary gearset,
the sun gear, the planetary gears and the ring gear each being provided with helical teeth,
the input shaft being at least indirectly supported by the housing in both axial directions by a single roller bearing,
the roller bearing is in a form of a deep-groove ball bearing, which is fixed, in the axial directions, both relative to the input shaft and relative to the housing and is guided, relative to the housing, in a radially floating manner, and
the deep-groove ball bearing is arranged in a bore in a bore section extending inside the housing or a flange, which serves to hold the input shaft in such a manner that, between an outer surrounding surface of an outer ring of the deep-groove ball bearing and a bottom of the bore section, an all-round radial gap is formed.

9. A planetary gearset of an axle transmission in a wheel axle of a vehicle, the planetary gearset comprising:
a sun gear having helical teeth and being connected rotationally fixedly to an input shaft of the planetary gearset;
a carrier on which planetary gears are rotatably mounted, the carrier being connected rotationally fixedly to an output shaft, and the planetary gears having helical teeth that mesh with the helical teeth of the sun gear;
a ring gear having helical teeth and being fixedly connected a housing that encloses the planetary gearset, and the helical teeth of the ring gear mesh with the helical teeth of the planetary gears; and
the input shaft being at least indirectly supported on the housing by a single roller bearing such that the input shaft is fixed in both axial directions relative to the housing and radially movable relative to the housing.

* * * * *